(12) United States Patent
Nandy et al.

(10) Patent No.: US 11,489,714 B2
(45) Date of Patent: Nov. 1, 2022

(54) METHOD AND SYSTEM FOR PERFORMING NETWORK FAULT ANALYSIS

(71) Applicant: HEWLETT PACKARD ENTERPRISE DEVELOPMENT LP, Houston, TX (US)

(72) Inventors: Tathagata Nandy, Bangalore (IN); Subramanian Muthukumar, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 27 days.

(21) Appl. No.: 17/221,806

(22) Filed: Apr. 4, 2021

(65) Prior Publication Data

US 2021/0320837 A1     Oct. 14, 2021

(30) Foreign Application Priority Data

Apr. 13, 2020  (IN) .............................. 202041015902

(51) Int. Cl.
| | |
|---|---|
| *H04L 12/00* | (2006.01) |
| *H04L 41/0631* | (2022.01) |
| *H04L 12/18* | (2006.01) |
| *H04L 45/02* | (2022.01) |

(52) U.S. Cl.
CPC .......... *H04L 41/0631* (2013.01); *H04L 12/18* (2013.01); *H04L 45/02* (2013.01)

(58) Field of Classification Search
None
See application file for complete search history.

(56) References Cited

PUBLICATIONS

Asaeda et al., "Mtrace Version 2: Traceroute Facility for IP Multicast", Request for Comments: 8487, IETF, Oct. 2018, 41 pages.

*Primary Examiner* — Abdelillah Elmejjarmi (57) ABSTRACT

The present disclosure relates a system and a method of identifying network faults residing in an underlay network. A network device initiating fault analysis sends a query message through a tunnel interface present in an overlay network configured over an underlay network. While an upstream interface is a network tunnel having a first end and a second end, a unicast path from the first end to the second end of the network tunnel is traced using a network route analysis function. Reachability of a destination device present on the second end of the network tunnel is identified. An output of the network route analysis function is appended with an output of a multicast network connectivity determining function to produce an appended result that is shared with the network device initiating fault analysis.

13 Claims, 5 Drawing Sheets

METHOD AND SYSTEM FOR PERFORMING NETWORK FAULT ANALYSIS

BACKGROUND

Computer networks utilize several network resources including network routers and network switches to provide connectivity between devices connected to the computer networks. Network virtualization allows creation of virtual networks, called overlay networks, on the underlying network resources to support multiple virtual devices. Therefore, an overlay network is built upon a physical or underlying network, and employs infrastructure of the underlying network. During transmission of data, the overlay network uses a network tunnel or point-to-point link for transfer of data, thereby alleviating the server and network bottlenecks. For transmission through the network tunnels, data packets are securely encapsulated at a first end of the network tunnel and decoded at a second end of the network tunnel. Through usage of such encapsulation, intermediate network devices present in the network tunnel are not able to identify and understand the data passed through the network tunnel, thereby providing secure communication of data between devices connected using the network tunnel.

Multicasting service delivers similar copies of data from one or more senders to a group of receivers. The multicasting service often implements an overlay network to securely deliver such similar copies of data to multiple devices connected in a computer network.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles of the present disclosure together with the description. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Performance of the computer networks are often impacted adversely due to occurrence of network faults within the computer networks. Network faults are generally caused due to Internet Protocol (IP) address conflicts, inability to connect to a device, unavailability of bandwidth, congestion of network, and/or improper configuration of devices. Network faults existing within a network path are determined by sending query packets that provide information related to connectivity of network devices present along the network path.

Network tunnels are used in computer networks for achieving secure communication between devices. A network tunnel is established between two network devices, a tunnel originator present at a first end and a tunnel terminator present at a second end, of the network tunnel. The tunnel originator and the tunnel terminator correspond to an overlay network. A tunnel originator has a network address of the tunnel terminator and may not have any information related to other network devices that exist within the network tunnel leading to the tunnel terminator. Similarly, a tunnel terminator has a network address of the tunnel originator. The other network devices that exist over the network path present between the tunnel originator and the tunnel terminator correspond to an underlay network.

When a network fault related to a network device present in an underlay network occurs and a query packet is launched in the underlay network for performing fault diagnosis, the query packet may not be able to go beyond the tunnel originator. The query packet may not be able to go beyond the tunnel originator due to lack of network address of a network device that has an immediate connection with the tunnel originator and is present within the underlay network. For example, a network tunnel includes a device 1 and a device 2 connected between a tunnel originator and a tunnel terminator. A query packet launched at the tunnel originator would not be able to reach the device 1 because the tunnel originator would lack a network address of the device 1. Due to lack of such information related to the network address, the query packet required to travel into the underlay network for collecting information related to a point of fault present in the underlay network may not be able to travel into the underlay network. Therefore, information related to the point of fault residing within the underlay network may not be obtained. Further, query packets used for tracing of network faults typically run on multicast protocols, and the underlay network does not support the multicast protocols and may not have an infrastructure required to support functioning of the query packets. The underlay network does not support multicast protocol because the underlay network corresponds to a network tunnel established only between the tunnel originator and the tunnel terminator. Therefore, the network tunnel corresponds to a unicast network that would support unicast protocols only, and not multicast protocols which is required for supporting the query packets. Also, in several instances, underlay networks are third party networks and packets can get dropped because of Maximum Transmission Unit (MTU) violation, Time To Live (TTL) error, or congestion in the underlay networks and remain undetected. Therefore, currently it is possible to perform fault analysis in overlay networks when the network fault resides in the underlay networks.

In order to overcome this problem, the present disclosure describes methods and systems for successfully performing fault analysis in an overlay network when a network fault lies in an underlay network.

Within a network path that is required to be traced, a segment of the network path involving the network tunnel and another segment present outside the network tunnel may be identified. Network devices present within the network tunnel may support a unicast protocol and network devices present outside the network tunnel may support a multicast protocol. Network devices supporting multicast protocol store multicast route entries that provide details of other network devices connected with the network device. Referring to such multicast route entry, a network device determines if an upstream device is connected to it without a network tunnel, for example through Ethernet, or connected through a network tunnel. In this manner, the presence of a network tunnel may be identified based on a multicast route entry stored in a network device from where the network tunnel begins. Such network device is identified as a tunnel originator, and the network tunnel leads to another network device where the network tunnel ends, i.e. a tunnel terminator. While traversing through a multicast network, upon reading a multicast route entry, if it is determined that an upstream interface is a network tunnel, a unicast path may be traced from the tunnel originator to the tunnel terminator. The unicast path may be traced using a network route analysis function. In one scenario, the tunnel terminator present at one end of the network tunnel may be reachable. During such a scenario, a query message may be forwarded upstream through the network tunnel to collect details of the point of fault in the network path.

In an alternate scenario, while tracing the unicast path across the network tunnel, the tunnel terminator may not be reachable. During such a scenario, a first data packet is obtained as an output of a multicast network connectivity determining function and a second data packet is obtained as an output of the network route analysis function. The multicast network connectivity determining function will assist in collection of connectivity information related to network devices present outside a network tunnel. Further, the network route analysis function will assist in collection of connectivity information related to network devices present within the network tunnel. Such information collected through the first data packet may be appended to the information collected through the second data packet to produce an appended result. The appended result may be shared with the host device for identifying the network fault residing along the network path i.e. within the underlay network. A detailed explanation of obtaining the first data packet and the second data packet is described in successive paragraphs with reference to the FIGS. 1 through 5.

Figure 1:
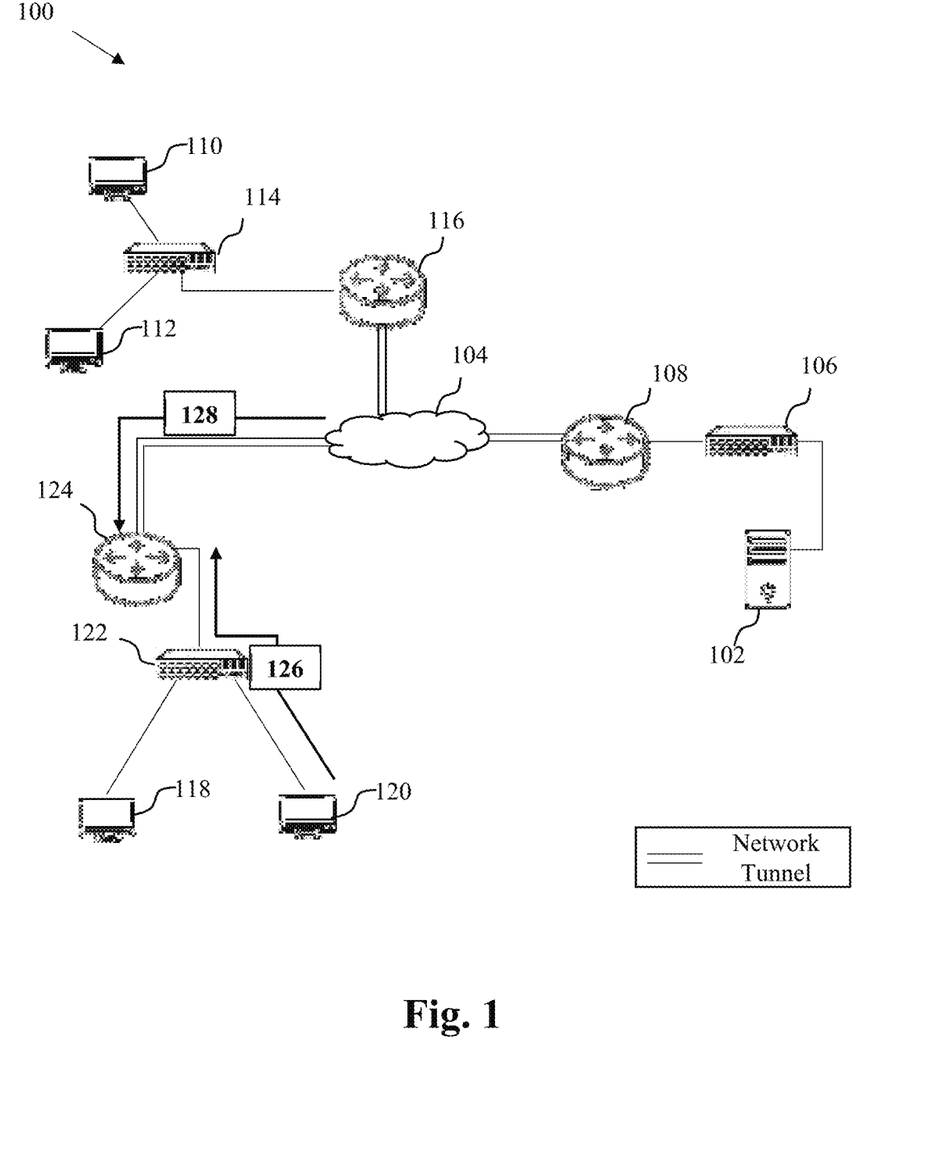
FIG. 1 illustrates a network connection diagram of system for multicast communication between a source and multiple receivers, in accordance with an embodiment of the present disclosure.

FIG. 1 illustrates a network connection diagram 100 for multicast communication between a source and multiple receivers, in accordance with an embodiment of the present disclosure. The network connection diagram 100 shows a source 102 connected to a communication network 104 through a first switch 106 and a first router 108. The source 102 may indicate a source of information, and such information may be required by receiving devices, for example receivers 110 and 112. The receivers 110 and 112 are connected to the communication network 104 through a third switch 114 and a third router 116. Similarly, receivers 118 and 120 are connected to the communication network 104 through a second switch 122 and a second router 124. Each of the first switch 106, a first router 108, second switch 122, second router 124, third switch 114, and the third router 116 may be cumulatively referred as network components. A single router and a single switch is shown to achieve communication between the end devices (source and receivers) and the communication network 104 merely for ease of illustration; however, multiple such routers and switches would generally be involved in each network path.

A network tunnel may be established between the first router 108 and the third router 116, and between the first router 108 and the second router 124, as illustrated through double lines in FIG. 1. The network tunnel may be established for multicasting of data from the source 102 to the receivers 110, 112, 118, and 120. Such network tunnel corresponds to an overlay network developed over an underlay network i.e. the communication network 104. During an occurrence of a network fault in a communication path between the source 102 and the receivers 110, 112, 118, and 120, a host device may initiate fault analysis. The host device initiating the fault analysis may be any of the first switch 106, the first router 108, the third switch 114, the third router 116, the second switch 122, or the second router 124. Further, a command for initiating the fault analysis could also be given through the receivers 110, 112, 118, and 120 operated by users.

In an exemplary aspect, a multicast network connectivity determining function is run through interface of the receiver 120 on the second switch 122. When the multicast network connectivity determining function is run, tracing of network path from the receiver 120 to the source 102 is attempted. A detailed process of tracing the network path from the receiver 120 to the source 102 is described below.

Connectivity information up to the second router 124 may be obtained using a multicast network connectivity determining function, such as, for example, an Mtrace patch function. Such information is collected as a first data packet 126, as also illustrated in FIG. 1. Multicast network connectivity determining function may not function ahead of the second router 124 due to presence of a network tunnel between the second router 124, i.e. a tunnel originator, and the first router 108, i.e. a tunnel terminator. Upon determining presence of the network tunnel ahead of the second router 124, a network route analysis function may be run to collect information pertaining to the network tunnel. Such information is collected as a second data packet 128, as also illustrated in FIG. 1. The first data packet 126 and the second data packet 128 may be appended at the second router 124 to produce an appended result. The appended result is then sent to the receiver 120 for performing fault analysis.

Figure 2:
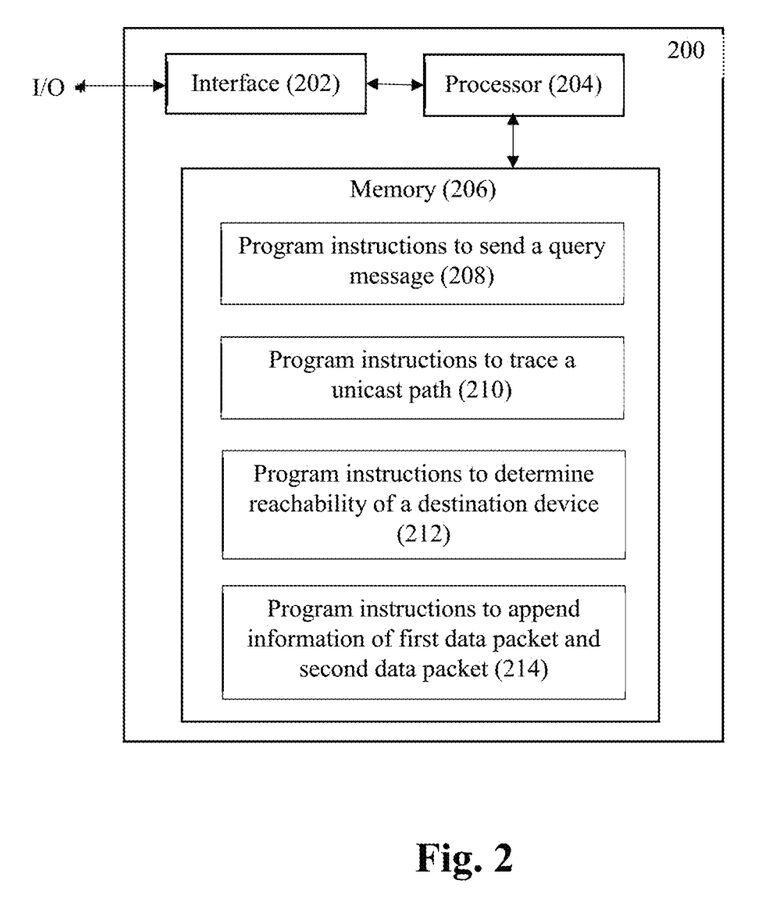
FIG. 2 illustrates a block diagram showing different components of a host device initiating fault analysis, in accordance with an embodiment of the present disclosure.

FIG. 2 illustrates a block diagram showing different components of a host device 200 initiating fault analysis, in accordance with an embodiment of the present disclosure. In one scenario, the second router 124 may be the host device 200 initiating and performing the fault analysis. The host device 200 may comprise an interface 202, a processor 204, and a memory 206. The memory 206 may store program instructions for performing several functions through which fault analysis could be performed by the host device 200. Functional code stored in the memory 206 may include program instructions to send a query message 208, program instructions to trace a unicast path 210, program instructions to determine reachability of a destination device 212, and program instructions to append the first data packet to the second data packet 214.

The program instruction to send a query message 208 may cause the processor 204 to send a query message through an entry point of a network tunnel. The network tunnel could be alternatively identified as an overlay network configured over an underlay network. The query message may determine connectivity to network devices present in the overlay network. The underlay network may provide a physical infrastructure supporting movement of data of the overlay network. The program instructions to trace a unicast path 210 may cause the processor 204 to trace a unicast path from a tunnel originator to a tunnel terminator of the network tunnel using a network route analysis function, for example a TraceRoute function. Utilizing details of the network tunnel present in the network originator, the network route analysis function may send query packets to the tunnel terminator. Such query packets may trace the unicast path between the tunnel originator and the tunnel terminator. The program instructions to determine reachability of a destination device 212 may cause the processor 204 to determine whether the destination device present on the second end of the network tunnel is reachable or not reachable. To determine reachability of the destination device, multicast routing information stored in a device initiating such a process may be accessed. Based on the multicast routing information, query packets may be forwarded to the destination device to determine its reachability.

The program instructions to append information of the first data packet and the second data packet 214 may cause the processor 204 to append information present in the first data packet as an output of a multicast network connectivity determining function and information present in a second data packet as an output of the network route analysis function to produce an appended result. A network device present at the first end of the network tunnel i.e. the tunnel originator, may append the information present in the first data packet and the information present in the second data packet.

Figure 3:
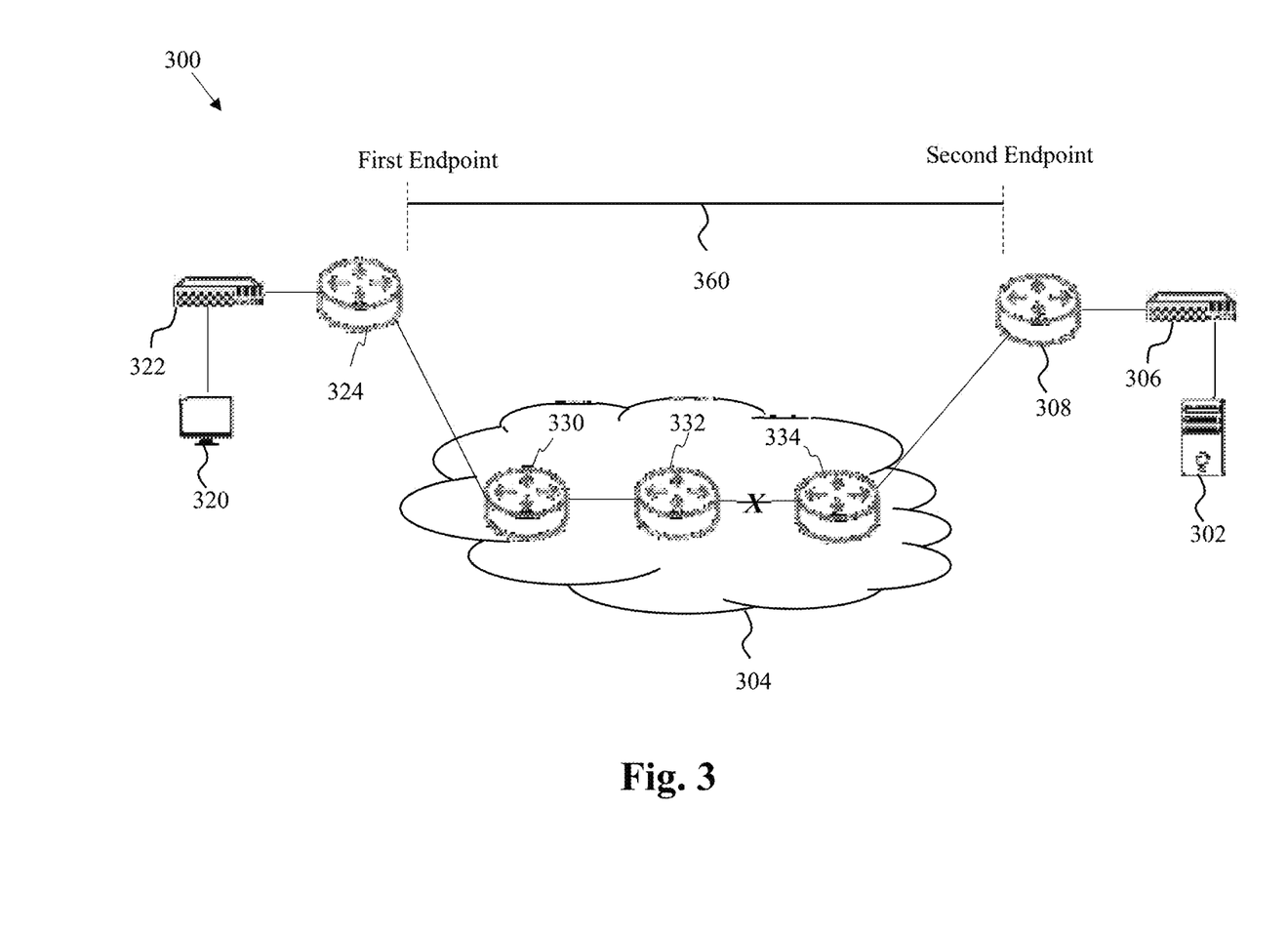
FIG. 3 illustrates a network connection diagram showing a receiver and a source connected through a network tunnel, in accordance with an embodiment of the present disclosure.

FIG. 3 illustrates a network connection diagram 300 showing a source 302 (similar to the source 102) and a receiver 320 (similar to the receiver 120) connected through a network tunnel 360. The network tunnel 306 is established over a communication network 304 (similar to the communication network 104). A multicast client device i.e. the receiver 320 is shown to be connected to the source 302 through multiple network devices. As illustrated in FIG. 3, in addition to the computer network 304, a network path present between the receiver 320 and the source 302 includes a first switch 306 (similar to the first switch 106), a first router 308 (similar to the first router 108), a second router 324 (similar to the second router 124), and a second switch 322 (similar to the first switch 122).

The network tunnel 360 i.e. the overlay network is established between the first router 308 and the second router 324. The overlay network is built over an underlay network contributed by the communication network 304, providing connection between the first router 308 and the second router 324. The underlay network includes a fourth router 330, a fifth router 332, and a sixth router 334.

As illustrated in FIG. 3, a first endpoint of the network tunnel 360 may be configured at a tunnel originator i.e. the second router 324, and a second endpoint of the network tunnel 360 may be configured at a tunnel terminator i.e. the first router 308. In one instance, a network link between the fifth router 332 and the sixth router 334 may be broken.

In one scenario, to perform fault analysis, a query message may be forwarded by the second switch 322, towards the multicast source 302. The query message may be able to reach the second router 324, and may not be able to reach the fourth router 330 present within the underlay network due to the absence of network address of the fourth router 330 in a multicast route table present at the second router 324. Further, the multicast route table present at the second router 324 may indicate presence of the network tunnel 360 ahead of the second router 324. Upon determining presence of the network tunnel 360 ahead of the second router 324, a first data packet may be obtained by executing a multicast network connectivity determining function. The first data packet obtained upon execution of the multicast network connectivity determining function may include connectivity details of network devices present outside the overlay network i.e. the second switch 322 and the second router 324. Such details collected by the first data packet are explained below.

In one instance, the second switch 322 may have an IP address of '10.1.1.1' and the second router 324 may have an IP address of '20.1.1.2'. The first data packet may include a traceability report about the second switch 322 and the second router 324, as represented below.

| TTL | Network Device's IP Address | PIM enabled/ Disabled | Time Delay |
| --- | --- | --- | --- |
| 0 | 10.1.1.1 | PIM enabled | 0 ms |
| 1 | 20.1.1.1 | PIM enabled | 100 ms |

The traceability report provided above indicates that the second switch 322 having an IP address of '10.1.1.1' and being Protocol Independent Multicast (PIM) enabled initiated a network query for producing the traceability report. PIM is a multicast routing protocol that runs over a unicast infrastructure. For being PIM enabled, the second switch 322 can multicast the query message to all other network devices connected with it. As the second switch 322 is connected only to the second router 324, the second switch 322 will multicast the query message to the second router 324. The second switch 322 is identified as a device initiating such network query for having a TTL of '0' and a time delay of 0ms. Further, the traceability report also indicates that the second router 324 having an IP address of '20.1.1.1' and being PIM enabled is present at a distance of 1 TTL from the second switch 322. The traceability report also indicates that a time delay of 100 ms occurs in traversal of an IP packet from the second switch 322 to the second router 324.

Upon obtaining the connectivity details of the network devices present outside the overlay network i.e. the second switch 322 and the second router 324, a network route analysis function may be executed to collect connectivity information related to the network tunnel 360. Functioning of the network route analysis function within the network tunnel 360 is now explained with reference to FIG. 4a through FIG. 4c.

Figure 4A:
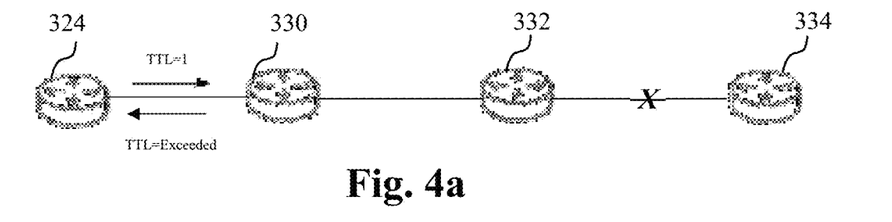
FIGS. 4a through 4c cumulatively illustrate functioning of a network route analysis function within a network tunnel, in accordance with an embodiment of the present disclosure.

At first, as illustrated in FIG. 4a, an Internet Protocol (IP) packet may be sent from the second router 324 to the fourth router 330. A header of the IP packet may comprise a Time To Live (TTL) field. The TTL field indicates a value (or hop count) associated with the IP packet, which is decremented each time, by a value of 1, when the IP packet passes hops or reaches a successive network device. When the value of TTL field turns zero, the IP packet is discarded. Therefore, the TTL field ensures that IP packet does not remain in the network indefinitely.

In a first attempt, the TTL of the IP packet sent by the second router 324 may be set as '1'. The fourth router 330 may receive the IP packet, and before forwarding the IP packet to the fifth router 332, value of the TTL may be reduced by 1. In such instance, the value of the TTL becomes zero, and the IP packet may be discarded by the fourth router 330. Further, a TTL exceeded message may be sent to the second router 324, from the fourth router 330.

Figure 4B:
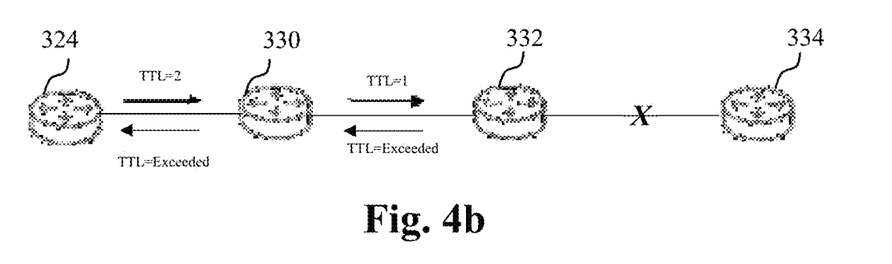

Due to failure of the IP packet in reaching the fifth router 332 in the first attempt, a second attempt may be made. In the second attempt, as illustrated in FIG. 4b, the second router 324 may send the IP packet towards the fourth router 330 with a TTL of value '2'. Upon receiving the IP packet, the fourth router 330 may reduce value of the TTL by '1' and may then forward the IP packet having a TTL of value '1' to the fifth router 332. The fifth router 332 may receive the IP packet having the TTL of value '1'. Before forwarding the IP packet to the fifth router 322, the fifth router 332 may reduce value of the TTL by '1'. In such instance, value of the TTL becomes zero, and the IP packet may be discarded by the fifth router 332. Further, the fifth router 332 may return a TTL exceeded message towards the second router 324.

Figure 4C:
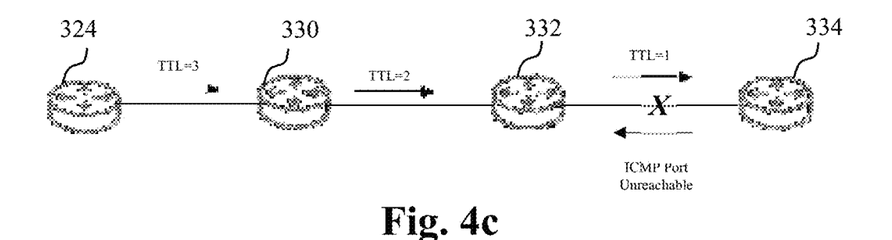

Due to failure of the IP packet in reaching the sixth router 334 in the second attempt, a third attempt may be made. In the third attempt, as illustrated in FIG. 4c, the second router 324 may send the IP packet to the fourth router 330 with a TTL of value '3'. Upon receiving the IP packet, the fourth router 330 may reduce value of the TTL to '2' and may then forward the IP packet to the fifth router 332. The fifth router 332 may receive the IP packet having a TTL of '2'. Before forwarding the IP packet to may reduce value of the TTL to '1'. In such instance, the IP packet having a value of the TTL as '1' may be forwarded towards the sixth router 334. Because the network link connecting the fifth router 332 and the sixth router 334 is down, the IP packet may not reach the sixth router 334.

The network route analysis function used for collecting connectivity information related to the network tunnel may utilize a unique port number different from port numbers used by other applications. Such unique port number provides a unique communication endpoint at the network devices. Further, data packets are identified and accepted at Transport layer of TCP/IP model, based on the unique port numbers associated with the data packets. Thus, when the IP packet is not able to reach a suitable application running at the sixth router 308, the IP packet may be dropped, and an Internet Configuration Management Protocol (ICMP) port unreachable message may be forwarded towards the second router 324, indicating drop of the IP packet.

In the above described manner, connectivity information related to the network device present in the network tunnel 360 (i.e. the fourth router 330 and the fifth router 332) may be collected using the network route analysis function. Such information may be referred as information present in a second data packet.

The second router 324 may append information present in the first data packet and information present in the second data packet to produce an appended output. In one example, the appended output may comprise information as represented below.

| TTL | Network Device's IP Address | PIM enabled/ Disabled | Time Delay |
| --- | --- | --- | --- |
| 0 | 10.1.1.1 | PIM enabled | 0 ms |
| 1 | 20.1.1.1 | PIM enabled | 100 ms |

Underlay Reachability

| TTL | Network Device's IP Address |
| --- | --- |
| 1 | 1.1.1.1 |
| 2 | 2.1.1.1 |

As illustrated in above provided appended output, connectivity details of network devices present in the underlay network (the fourth router 330 and the fifth router 332) are also obtained along with network devices present outside the underlay network (the first switch 308 and the second router 324). The connectivity details related to the network devices present outside the underlay network are received in the first data packet obtained upon execution of the multicast network connectivity determining function. Further, the connectivity details related to the network devices present in the underlay network are received in the second data packet obtained upon execution of the network route analysis function. In this manner, connectivity details of network devices present within and outside an underlay network could be obtained, using the system and method described in above provided embodiments of current disclosure.

In one example, in an embodiment similar to the above provided appended output, the second router 324 may determine that the traced network path includes a network tunnel initiating from the second router 324 having the IP address '20.1.1.2'. Upon such determination, a network route analysis function may be executed by the second router 324. The network route analysis function may identify the fifth router 332 having the IP address '2.1.1.1' as a last network device that is reachable in the network tunnel. From such identification, the network route analysis function may conclude that the sixth router 334 is not reachable, and thus the network link between the fifth router 332 and the sixth router 334 is down. Such information collected using the network route analysis function may be appended to an output of a multicast network connectivity determining function, and an appended output may be obtained. Such appended output could then be conveyed to a person responsible for addressing the network faults. Therefore, in the above described manner, network faults could be located and addressed, even when the network faults exist in an underlay network.

Figure 5:
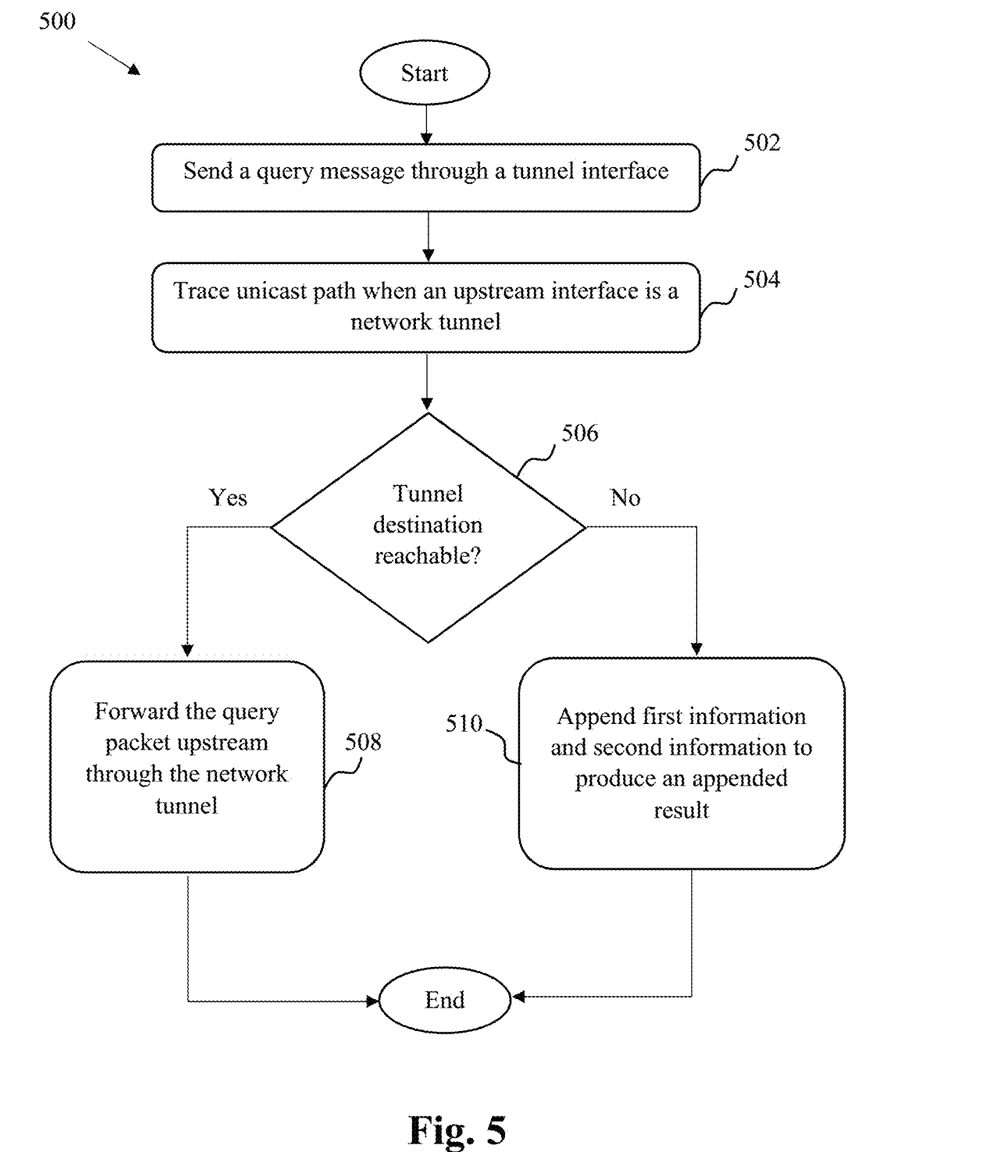
FIG. 5 illustrates a flowchart showing a method of performing fault analysis in an overlay network while a network fault occurs in an underlay network, in accordance with an embodiment of the present disclosure.

Referring now to FIG. 5, a method of performing fault analysis in an overlay network while a network fault occurs in an underlay network is described, with reference to the flowchart 500. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

Upon occurrence of a network fault affecting connectivity and performance of a computer network, fault analysis may be performed. A network device such as a network switch may initiate the fault analysis in an overlay network supporting multicasting technique, to identify a network fault existing that may exist within an underlay network providing supporting infrastructure to the overlay network. The fault analysis may be performed using a suitable function, such as a multicast network connectivity determining function. In one case, the multicast network connectivity determining function may be a part of a network diagnostic tool.

At block 502, to initiate fault analysis, a query message may be sent towards a destination device from which information needs to be received, for example a source of the information. The source may indicate a device at which the information either originates or is kept stored. In one case, a User Datagram Protocol (UDP) packet could be sent as the query message. To send the query message towards the source, a first network device present on a data receiving end may identify network path information. The network path information may be retrieved from a multicasting routing table stored in the first network device, and may comprise information of a second network device present upstream to the first network device. Using such network path information, the query message may be forwarded to the second network device present upstream. In this manner, the query message may be forwarded upstream until a network tunnel is identified within the network path.

At block 504, a unicast path may be traced while the network tunnel is identified to be present in the network path. The network tunnel may have at least two ends i.e. a first end and a second end, configured at a tunnel originator and a tunnel terminator respectively. In such case, a unicast path may be traced from the first end of the network tunnel to the second end of the network tunnel. The unicast path may be traced using a suitable function, such as a network route analysis function. The network route analysis function may be a part of the network diagnostic tool.

At block 506, reachability to the second end of the network tunnel may be determined. In one scenario, while the second end of the network tunnel is identified to be reachable, the query message i.e. the UDP packet may be forwarded to a network device connected at the second end of the network tunnel, at block 508.

In another scenario, while the second end of the network tunnel is identified to be unreachable, information present in a first data packet obtained as an output of a multicast network connectivity determining function and information present in a second data packet obtained as an output of the network route analysis function may be appended to produce an appended result, at block 510. The appended result may include details of all the network devices present out of and within the network tunnel i.e. the underlay network. Therefore, the appended result may also provide details of a network fault residing in the underlay network when a fault analysis is performed in the overlay network.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

The detailed description set forth above in connection with the appended drawings is intended as a description of various embodiments of the present disclosure and is not intended to represent the only embodiments in which the present disclosure may be practiced. Each embodiment described in this disclosure is provided merely as an example or illustration of the present disclosure, and should not necessarily be construed as preferred or advantageous over other embodiments.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

A network tunnel may be established using any of Internet Protocol (IP) tunnelling, Generic Routing Encapsulation (GRE) tunnelling, OpenVPN tunnelling, Secure Socket Tunneling Protocol (SSTP), Internet Protocol Security (IPsec) tunnelling, Layer 2 Tunneling Protocol (L2TP), Virtual Extensible Local Area Network (VXLAN), Secure Shell (SSH) tunnelling, Hyper Text Transfer Protocol (HTTP) tunnelling, Internet Configuration Management Protocol (ICMP) tunnelling, General Packet Radio Service (GPRS) Tunnelling Protocol (GTP), Multiprotocol Label Switching (MPLS) tunnelling, and Virtual private network (VPN) tunnelling.

A communication network may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

Receivers may be devices capable of being connected over the communication network to perform one or more functions. A few such devices may include a personal computer, laptop, desktop, tablet, server, Hard Disk Drives (HDDs), printers, cameras and Voice over Internet Protocol (VoIP) phones. The receivers may be Protocol-Independent Multicast (PIM) enabled and/or Multicast Listener Discovery (MLD) enabled.

Network components may be utilized to establish connection between different user devices present in a network. Such user devices may include desktops, laptops, servers, smart phones, tablets, printers, cameras, and the like. The network components may include, hubs, switches, routers, bridges, and repeaters. The routers may be of different types such as Provide Edge (PE) routers, Customer Edge (CE) routers, and intermediate routers. The switches and the routers are primary network components, wherein the switches are used to connect the user device present within a network, and the routers are used to connect multiple networks.

An interface may be used to provide input or fetch output from the host device. The interface may be implemented as a Command Line Interface (CLI), Graphical User Interface (GUI). Further, Application Programming Interfaces (APIs) may also be used for remotely interacting with the host device 200.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is not limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

We claim:

1. A method comprising:
sending, by a host device initiating fault analysis, a query message through a tunnel interface present in an overlay network configured over an underlay network, wherein the query message determines connectivity to network devices present in the overlay network, and the underlay network provides a physical infrastructure supporting movement of data of the overlay network,
tracing, while an upstream interface is a network tunnel having a first end and a second end, a unicast path from the first end to the second end of the network tunnel, using a network route analysis function;
determining that a destination device present on the second end of the network tunnel is not reachable;
appending information present in a first data packet obtained as an output of a multicast network connectivity determining function and information present in a second data packet obtained as an output of the network route analysis function to produce an appended result; and
sending the appended result to the host device.

2. The method as claimed in claim 1, wherein the network devices comprise switches and routers.

3. The method as claimed in claim 1, wherein the query message is a User Datagram Protocol (UDP) packet.

4. The method as claimed in claim 1, wherein the network tunnel utilizes at least one of Internet Protocol (IP) tunnelling, Generic Routing Encapsulation (GRE) tunnelling, OpenVPN tunnelling, Secure Socket Tuneling Protocol (SSTP), Internet Protocol Security (IPsec) tunnelling, Layer 2 Tunneling Protocol (L2TP), Virtual Extensible Local Area Network (VXLAN), Secure Shell (SSH) tunnelling, Hyper Text Transfer Protocol (HTTP) tunnelling, Internet Configuration Management Protocol (ICMP) tunnelling, General Packet Radio Service (GPRS) Tunnelling Protocol (GTP), Multiprotocol Label Switching (MPLS) tunnelling, and Virtual private network (VPN) tunnelling.

5. The method as claimed in claim 1, wherein a network device present at the first end of the network tunnel appends the information present in the first data packet obtained as the output of the multicast network connectivity determining function and the information present in the second data packet obtained as the output of the network route analysis function.

6. The method as claimed in claim 1, wherein an output of the network route analysis function includes details of the network devices with which communication could be established, and wherein the network devices are present in one or more network paths.

7. A network device comprising:
a processor; and
a memory storing programmed instructions, which when executed by the processor, causes the processor to:
send a query message through a tunnel interface present in an overlay network configured over an underlay network, wherein the query message determines connectivity to network devices present in the overlay network, and the underlay network provides a physical infrastructure supporting movement of data of the overlay network;
trace, while an upstream interface being a network tunnel having a first end and a second end, a unicast path from the first end to the second end of the network tunnel, using a network route analysis function;
determine that a destination device present on the second end of the network tunnel is not reachable;
append information present in a first data packet obtained as an output of a multicast network connectivity determining function and information present in a second data packet obtained as an output of the network route analysis function to produce an appended result; and
send the appended result to a host device that generated the query message.

8. The network device as claimed in claim 7, wherein the network devices comprise switches and routers.

9. The network device as claimed in claim 7, wherein the query message is a User Datagram Protocol (UDP) packet.

10. The network device as claimed in claim 7, wherein the network tunnel utilizes at least one of Internet Protocol (IP) tunnelling, Generic Routing Encapsulation (GRE) tunnelling, OpenVPN tunnelling, Secure Socket Tunneling Protocol (SSTP), Internet Protocol Security (IPsec) tunnelling, Layer 2 Tunneling Protocol (L2TP), Virtual Extensible Local Area Network (VXLAN), Secure Shell (SSH) tunnelling, Hyper Text Transfer Protocol (HTTP) tunnelling, Internet Configuration Management Protocol (ICMP) tunnelling, General Packet Radio Service (GPRS) Tunnelling Protocol (GTP), Multiprotocol Label Switching (MPLS) tunnelling, and Virtual private network (VPN) tunnelling.

11. The network device as claimed in claim 7, wherein a network device present at the first end of the network tunnel appends the information present in the first data packet obtained as the output of the multicast network connectivity determining function and the information present in the second data packet obtained as the output of the network route analysis function.

12. The network device as claimed in claim 7, wherein an output of the network route analysis function includes details of the network devices with which communication could be established, and wherein the network devices are present in one or more network paths.

13. A non-transitory machine-readable storage medium that stores instructions which, when executed by a processor, perform a plurality of operations comprising:
sending a query message through a tunnel interface present in an overlay network configured over an underlay network, wherein the query message determines connectivity to network devices present in the overlay network, and the underlay network provides a physical infrastructure supporting movement of data of the overlay network;

tracing, while an upstream interface is a network tunnel having a first end and a second end, a unicast path from the first end to the second end of the network tunnel, using a network route analysis function;

determining that a destination device present on the second end of the network tunnel is not reachable;

appending information present in a first data packet obtained as an output of a multicast network connectivity determining function and information present in a second data packet obtained as an output of the network route analysis function to produce an appended result; and send the appended result to a host device that initiated fault analysis.

* * * * *